United States Patent [19]
Ingram

[11] Patent Number: 5,240,402
[45] Date of Patent: Aug. 31, 1993

[54] APPARATUS FOR PREPARING HOLLOW PLASTIC ARTICLE

[75] Inventor: Ronald W. Ingram, Toronto, Canada

[73] Assignee: Husky Injection Molding Systems Ltd., Bolton, Canada

[21] Appl. No.: 979,892

[22] Filed: Nov. 23, 1992

[51] Int. Cl.[5] .............................................. B29C 49/62
[52] U.S. Cl. ....................... 425/522; 425/450.1; 425/541; 425/812
[58] Field of Search ............... 425/522, 541, 812, 534, 425/451.6, 451.5; 164/305; 264/526; 65/263

[56] References Cited

U.S. PATENT DOCUMENTS

| | | | |
|---|---|---|---|
| 2,785,448 | 3/1957 | Hodler | 164/305 |
| 3,078,508 | 2/1963 | Martin, Jr. | 425/526 X |
| 4,120,636 | 10/1978 | Appel et al. | 425/541 |
| 4,140,468 | 2/1979 | Duga | 425/534 |
| 4,421,472 | 12/1983 | Martin, Jr. | 425/534 X |
| 4,489,771 | 12/1984 | Takeshima et al. | 164/305 |
| 4,648,831 | 3/1987 | Johnson | 425/541 X |
| 4,690,633 | 9/1987 | Schad et al. | 425/534 X |
| 4,793,960 | 12/1988 | Schad et al. | 264/535 |
| 4,995,445 | 2/1991 | Shigyo | 164/305 |

FOREIGN PATENT DOCUMENTS 42-665 1/1967 Japan ..................................... 264/526

*Primary Examiner*—Richard L. Chiesa
*Attorney, Agent, or Firm*—Bachman & LaPointe

[57] ABSTRACT

Apparatus includes a blow mold for forming a hollow plastic article forming a parison including at least reciprocable mold portions affixed to platens, wherein the mold portions are relatively movable from an open to a closed position including a spacing bar contacting the platens in the mold closed position operative to space apart the mold portions in the closed position thereof to form a controlled vent therebetween.

10 Claims, 3 Drawing Sheets

APPARATUS FOR PREPARING HOLLOW PLASTIC ARTICLE

BACKGROUND OF THE INVENTION

Plastic parisons or preforms are conventionally reheated and formed into hollow plastic articles by blow molding in a blow mold using high pressure fluid, with if desired using a stretch rod for stretch blow molding.

The preforms are preheated in ovens immediately prior to being transferred into a blow mold. Stretch rods may be incorporated with the blow mold and typically enter the preforms from its open end and extend before and during the blow stage to cause biaxial orientation of polymer molecular chains of the blown article.

A two stage reheat blowing machine of the type described in U.S. Pat. Nos. 4,793,960, 4,690,633 and 4,522,581 uses a series of pallets to carry preforms through a series of processing stages: thermal conditioning, stretch-blow molding and strip-off or ejection. At the stretch-blow molding station it is important that the preform is accurately aligned with the blow mold to insure that the finished blown article is symmetrically formed with respect to the neck finish.

The present invention deals with an apparatus for venting the blow mold during the foregoing procedure.

In most kinds of mold and casting processes a provision is made in the mold to allow air or gases to vent from the mold cavity so that the molding material can completely fill the cavity and form a part that is free from voids. Injection molding of plastic requires the venting to permit the escape of air while preventing the escape of the incoming plastic, which is being injected at high pressure, typically 20,000 psi. Vents in injection molds are therefore typically 0.001–0.003" wide. However, most plastic parts are made with constant wall thicknesses in the range of 0.010–080" and even for parts with large surface areas the volume of air in the mold to be vented is comparatively small.

The process of blow molding, including stretch blow molding, uses a preheated preform, or parison, which is enlarged rapidly by the admission of high pressure fluid, usually air at up to 1,000 psi, to the interior of the preform to inflate it until it is pressed against the interior walls of a closed blow mold cavity. Consequently, the comparatively large volume of air trapped inside the closed blow mold cavity before the preform is inflated must escape, or be vented, as rapidly as the preform is inflated. Typically, the blowing portion of the cycle is less than 1 second. In the case of a 2 liter beverage bottle the volume of air to be vented is slightly less than 2 liters. Although blow mold vents, typically in the parting surface of the mold, can be wider than injection molding vents, they are limited to 0.010" because wider vents cause an unsightly witness line to be formed on the outer surface of the article.

It is conventional to clamp mold halves together and to cut vents into the mold's parting surfaces to minimize these witness lines. Thus the clamping force is distributed over that area of parting surface that remains after vents have been cut. If this area is too small the mold halves will be deformed or "hobbed", a form of cold working, until the vents are eliminated and their area once again added to help support the clamp force. Meanwhile the elimination of the vents has made the mold useless.

U.S. Pat. No. 3,078,508 shows a blow mold made from porous material and provided with a vacuum-blow air pump. The air in the closed mold is evacuated before the preform is inflated to speed up the cycle and improve the part quality. However, a porous mold structure is inherently weak and the system is costly since a vacuum-blow pump and ancillary controls must be provided. U.S. Pat. No. 4,489,771 shows a venting device which provides a large opening to vent a large amount of gas while providing a means to automatically close the vent when the injected resin reaches it. The complicated device only operates at very local places on the parting line, and would not function if used in a blow mold, wherein there is no easily flowing resin to close the valve. Copending U.S. patent application Ser. No. 935,632 filed on Aug. 24, 1992, shows a toggle mechanism including a rotatable crankshaft and linkage means connecting the crankshaft to at least one mold portion wherein the overstroked position of the crankshaft forms a vent between mold portions.

It is therefore a principal objective of the present invention to provide a simple, convenient and easy to use apparatus whereby air trapped in a blow mold cavity is conveniently and expeditiously released without adverse effects on the blow molded product.

SUMMARY OF THE INVENTION

In accordance with the present invention, it has now been found that the foregoing objects and others can be readily achieved.

The apparatus of the present invention comprises: a blow mold for forming a hollow plastic article from a parison including at least two relatively reciprocable mold portions affixed to platens, wherein said mold portions form a mold cavity therebetween having a shape of a desired hollow plastic article; means for holding the parison within the blow mold; means for relatively moving said mold portions from a first open position to a second closed position wherein the mold portions have a shape of a desired hollow plastic article; spacing means contacting said platens operative to space apart said mold portions in the closed position thereof to form a controlled vent therebetween; and means for introducing high pressure fluid into the parison to expand same into conformity with the mold cavity; whereby air trapped in the mold cavity is released via said controlled vent.

Both mold portions may be movable or only one movable, and preferably the mold portions are spaced apart to form a controlled vent to the mold cavity from 0.001" to 0.010" wide.

A first movable platen is generally connected to one mold portion and a second movable platen connected to a second mold portion wherein the means for relatively moving the mold portions moves the platens in synchronism.

The spacing means may be affixed to one of the platens, or connected thereto by linkages, or affixed to the machine frame. Preferably, the spacing means is a spacing bar which contacts both of the platens in the closed position of the mold portions to prevent the mold portions from contacting each other at the position of the controlled vent and to form a continuous controlled vent between the mold portions.

Further features and advantages of the present invention will appear hereinbelow.

BRIEF DESCRIPTION OF THE DRAWINGS

The present invention will be more readily understandable from a consideration of the accompanying drawings, wherein.

DETAILED DESCRIPTION OF THE PREFERRED EMBODIMENT

Figure 1:
FIG. 1 is a block diagram showing the stations through which the parisons pass.

Referring to the drawings, FIG. 1 shows in a block diagram the preferred cycle from injection station where the parisons or preforms are prepared, to receiving station where they are transferred to holding means including mandrels, preferably by a robot, to a temperature conditioning station where the temperature is adjusted so as to be suitable for blowing and biaxial orientation, to the blowing station, and finally to the blown article removal station. The cycle is shown in U.S. Pat. No. 4,690,633. The particular features of the overall cycle are not critical to the present invention. Thus, one can readily use an apparatus as shown and described in U.S. Pat. No. 4,690,633. The parisons may or may not be prepared in-line with the other operations and may readily be made at a different time. The transfer path may take the form of an oval path, a straight path, or a horse-shoe shaped path, or any convenient configuration.

The apparatus of the present invention is directed to the blow molding station and particularly to an apparatus for releasing the air trapped in the mold cavity upon expansion of the parison therein.

Figure 2:
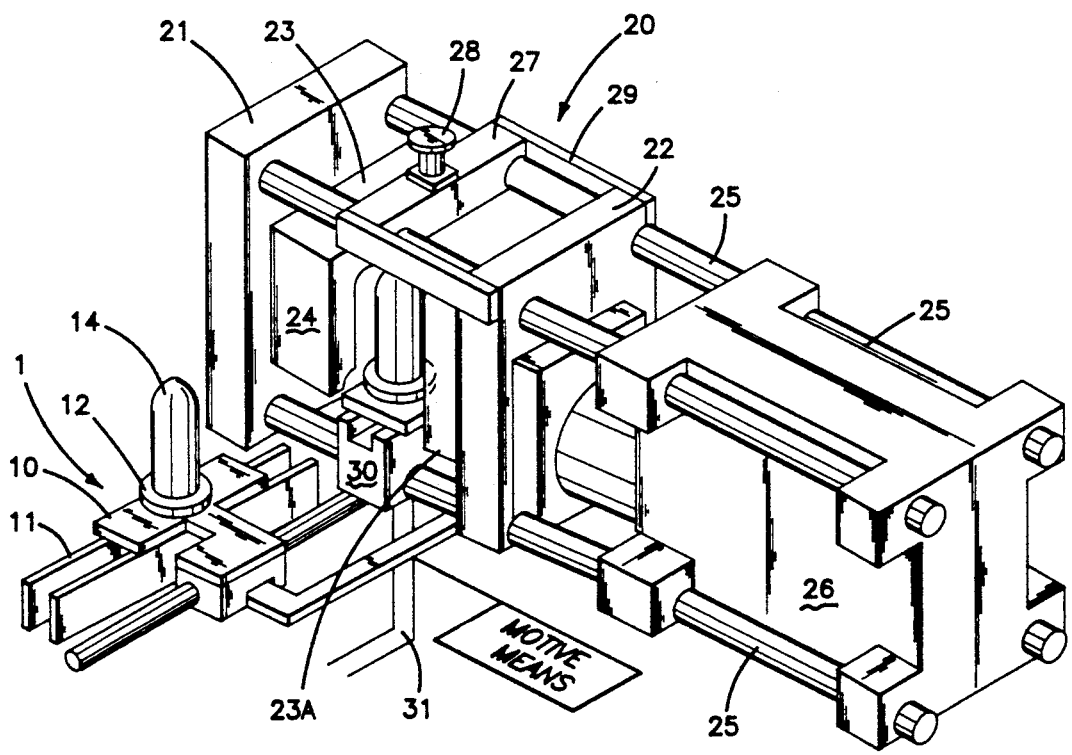
FIG. 2 is an isometric view of the blow molding station.

FIG. 2 is an isometric schematic view of a representative blow molding station including the holding means with parison thereon aligned and ready to be received by the blow mold. FIG. 2 shows a single holding means carrying a single parison; however, it should be understood that the present invention may readily be used when the holding means carries a plurality of parisons or when a plurality of mandrels carry a plurality of parisons. For convenience, in the following discussion, the present invention has been described with a single holding means carrying a single parison.

Referring to FIG. 2, holding means 1 includes pallets 10 retained in channel track 11 having been transferred thereto from the conditioning station by means not shown. Pallets 10 hold rotatable mandrels 12 which in turn hold parisons or preforms 14. The particular parison shape is representative only and any suitable shape can be used. The parison and mandrel arrives at the blow station after traversing a conditioning station on a rotating mandrel as described in the aforesaid U.S. Pat. No. 4,690,633.

Blow mold 20 includes fixed first platen 21 and movable second platen 22, fixed first mold portion 23 and movable second mold portion 23A forming therebetween a mold cavity 24 in the shape of the hollow article to be formed. Movable platen 22 moves on tie rods 25 activated by motor 26. Base mold 27, if used, is positioned above mold 24 to form the article bottom with piston 28 connected thereto for moving the bottom mold into appropriate alignment for formation of the desired base for the article and motive means (not shown) connected thereto for activating said piston. If desired, both platens and mold portions may be movable, but the present invention also contemplates one being fixed as shown in FIG. 2. Linkage means 29 are provided connected to the movable platen 22 and bottom mold 27 in order to maintain the desired positioning thereof. For clarity only, the top linkage means are shown in FIG. 2. Channel track 30 sits spaced from but closely adjacent to channel track 11 so that pallets 10 can readily move into position in the blow mold. The holding means may include a depending leg or spindle or other means which may be engaged by a chain link or any other desired motive means for moving the pallet. Means 31 are also provided for introducing high pressure fluid from a fluid source (not shown) into the parison in the mold cavity to expand the parison into conformity with the mold cavity. As indicated above, if desired, a stretch rod may also be provided for introduction into the parison as is known in the art to provide a stretch blow molded article.

The present invention utilizes a spacing means, as a spacing bar, which contacts the platens and which is operative to space apart the mold portions in the closed position thereof to form a controlled vent therebetween. This is clearly shown in FIGS. 3-4.

Figure 3:
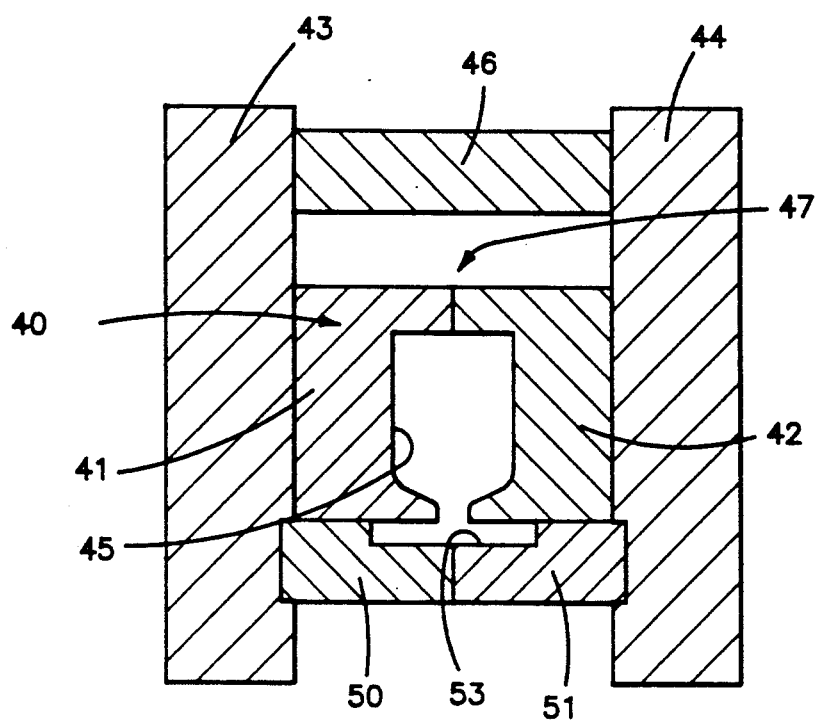
FIG. 3 is a sectional view through an apparatus of the present invention in the mold closed position.
Figure 4:
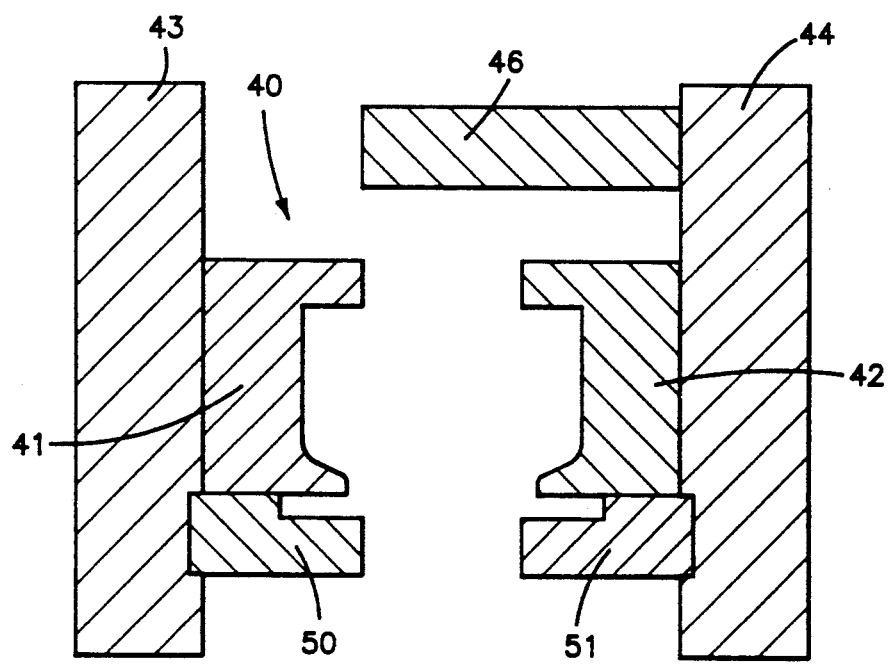
FIG. 4 is a sectional view similar to FIG. 3 in the mold open position.

FIG. 3 shows blow mold 40 in the closed position and FIG. 4 shows the blow mold in the open position. Mold portions 41 and 42 are affixed to platens 43 and 44, respectively, as for example by bolting, and in the mold closed position of FIG. 3 form mold cavity 45 therebetween having a shape of a desired article. The platens and mold portions affixed thereto are relatively reciprocable from mold open to closed to open positions via motive means (not shown). As shown in FIGS. 3 and 4, both platens and mold portions may be movable, or if desired one may be fixed.

Mold portions 41 and 42 are spaced apart by spacing means or spacing bar 46 affixed to platen 44 so that when platens 43 and 44 move, mold portions 41 and 42 from the mold open to the mold closed position, spacing means 46 contacts both platens 43 and 44 and forms a controlled, predetermined vent 47 between the mold portions, preventing the mold portions from contacting each other at the position of the controlled vent.

Mandrel locking means 50 and 51 are each mounted to a respective platen 43 and 44 beneath mold portions 41 and 42, also acting as a shelf onto which the two mold halves are placed. This facilitates changing the mold. The mandrel locking means 51 and 52 include space 53 therebetween adjacent mold cavity 45 to accommodate a parison holding means or pallet. The mandrel locking means also serve lower mold spacing means to control the mold portions in the closed position.

The spacing means 46 may be affixed to one of the platens as shown or linked thereto, or if desired affixed to the machine frame, or connected in any other suitable way.

Thus, a continuous gap 47 is conveniently and expeditiously formed between the mold halves of desired dimension and without stress on moving parts. This readily allows venting of the air trapped between the inside cavity shape and the rapidly expanding preform during blowing. Moreover, in accordance with the apparatus of the present invention, the controlled vent remains uniform during repeated cycles. Means are provided above and below the mold portions to accurately and consistently provide the desired configuration and space apart the platens in the mold closed position. A predetermined space is formed between the mold faces to enable efficient venting. These two mold surfaces never contact each other and consequently do not wear or become damaged as is the case in conventional molding systems.

Figure 5:
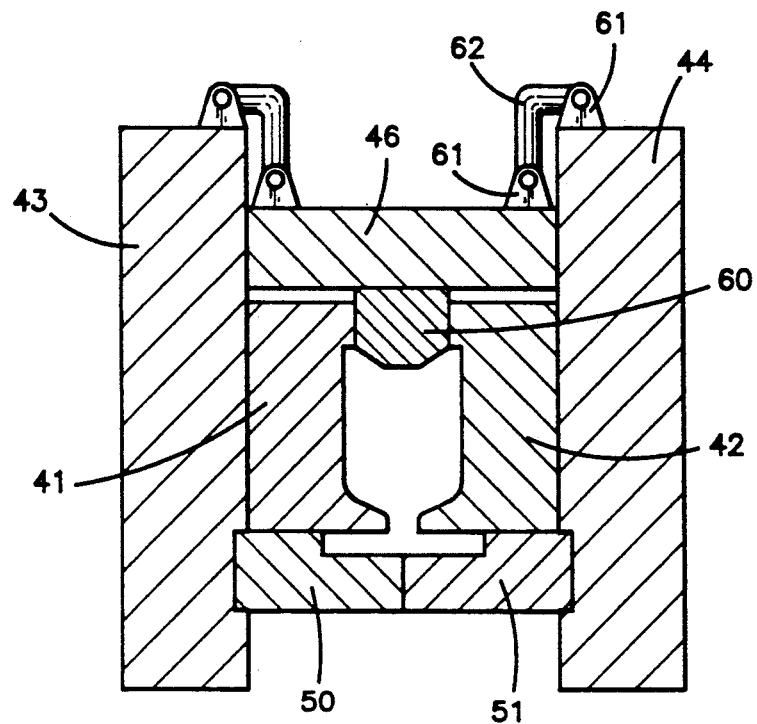
FIGS. 5-6 are sectional views similar to FIGS. 3 and 4 showing another embodiment of the present invention.
Figure 6:
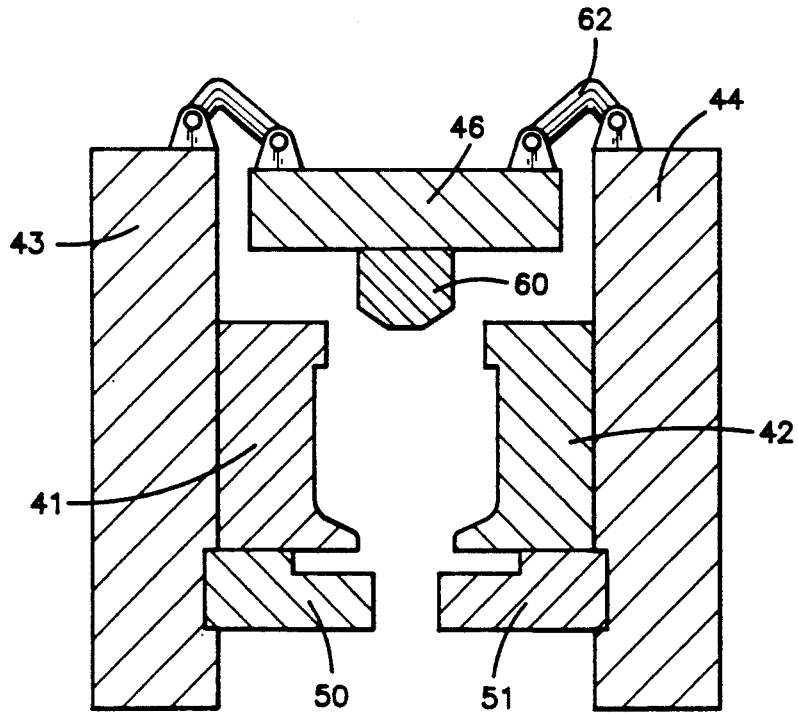

Optionally, provision can be made for the spacing means to carry a mold component, as bottom mold 27 shown in FIG. 2, within the scope of the present invention. For example, a bottom mold insert 60 can be connected to the spacing bar as shown in FIGS. 5-6 wherein spacing bar 46 is connected to moving platens 43 and 44. Two sets of pivot bearings 61 are each mounted on the ends of bar 46 and platens 43 and 44. Links 62 connect the respective bearings such that when the platens move toward each other the spacing bar 46 is lowered toward the mold 45 and when the platens are moved apart bar 46 is raised away from the mold 45. As shown, bar 46 is used as a mounting platform for an optional mold insert 60, which is desirably a round plug, to form a recess in the base of the blown article. For example, a dimple in the base of a champagne-style bottle. The controlled vent would desirably be on either side of the insert in the seated position shown in FIG. 5. The vertical motion of bar 46 is required in order to extract insert 60 from the blown article before the article (still on its pallet) can be transported out of the mold area.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

I claim:

1. An apparatus for preparing a hollow plastic article which comprises: a blow mold for forming a hollow plastic article from a parison including at least two relatively reciprocable mold portions affixed to platens, wherein said mold portions form a mold cavity therebetween having a shape of a desired hollow plastic article; means for holding the parison within the blow mold; means for relatively moving said mold portions from a first open position to a second closed position wherein the mold portions form the mold cavity therebetween having the shape of the desired hollow plastic article; spacing means contacting said platens in the mold closed position operative to space apart said mold portions in the closed position thereof to form a controlled vent therebetween; and means for introducing high pressure fluid into the parison to expand same into conformity with the mold cavity; whereby air trapped in the mold cavity is released via said controlled vent.

2. Apparatus according to claim 1 wherein both mold portions are movable.

3. Apparatus according to claim 1 wherein the mold portions are spaced apart to form a controlled vent to the mold cavity from 0.001" to 0.010" wide.

4. Apparatus according to claim 1 including a first movable platen connected to one mold portion and a second movable platen connected to a second mold portion, wherein said means for relatively moving said mold portions relatively moves the platens in synchronism.

5. Apparatus according to claim 1 wherein said spacing means is affixed to one of said platens.

6. Apparatus according to claim 1 wherein said spacing means is a spacing bar which contacts both of said platens in the closed position of said mold portions to prevent the mold portions from contacting each other at the position of the controlled vent and form a continuous controlled vent between the mold portions.

7. Apparatus according to claim 1 including lower mold spacing means beneath the mold portions affixed to the platens.

8. Apparatus according to claim 1 wherein said spacing means is affixed to both of said platens.

9. Apparatus according to claim 1 wherein the spacing means carries a mold component.

10. Apparatus according to claim 9 wherein the mold component is a bottom mold insert which forms a portion of the blow mold in the mold closed position.

* * * * *